US010814230B2

(12) United States Patent
Payzer et al.

(10) Patent No.: US 10,814,230 B2
(45) Date of Patent: Oct. 27, 2020

(54) INTERACTIVE EVENT BROADCASTING

(71) Applicant: Microsoft Technology Licensing, LLC, Redmond, WA (US)

(72) Inventors: Gershom L. Payzer, Redmond, WA (US); Richard Michael Fox, Berlin (DE); Gregory M. Smith, Seattle, WA (US); Hutchenson Judson White, Maple Valley, WA (US); Connor Peet, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 179 days.

(21) Appl. No.: 15/867,512

(22) Filed: Jan. 10, 2018

(65) Prior Publication Data

US 2019/0111343 A1    Apr. 18, 2019

Related U.S. Application Data

(60) Provisional application No. 62/571,692, filed on Oct. 12, 2017.

(51) Int. Cl.
*A63F 13/52* (2014.01)
*A63F 13/86* (2014.01)
(Continued)

(52) U.S. Cl.
CPC ............. *A63F 13/52* (2014.09); *A63F 13/25* (2014.09); *A63F 13/27* (2014.09); *A63F 13/69* (2014.09);
(Continued)

(58) Field of Classification Search
CPC ................................. A63F 13/52; A63F 13/86
See application file for complete search history.

(56) References Cited

U.S. PATENT DOCUMENTS 7,451,401 B2    11/2008  Tanskanen et al.
8,091,111 B2     1/2012  Logan et al.
(Continued)

FOREIGN PATENT DOCUMENTS

WO    2008024420 A2    2/2008
WO    2013138370 A1    9/2013

OTHER PUBLICATIONS

"International Search Report and Written Opinion Issued in PCT Application No. PCT/US18/054489", dated Nov. 30, 2018, 12 Pages.
(Continued)

*Primary Examiner* — James S. McClellan
(74) *Attorney, Agent, or Firm* — Alleman Hall Creasman & Tuttle LLP

(57) ABSTRACT

A method for interactive event broadcasting includes receiving a video stream depicting an interactive event. Data representing one or more interactive event controls is received, the interactive event controls being manipulable by a viewer of the interactive event to provide input to the interactive event. The video stream depicting the interactive event and the one or more interactive event controls are displayed as components of a user interface, the video stream and the interactive event controls having a first spatial relationship. Based on detecting a change in state of the interactive event, the first spatial relationship between the video stream and the one or more interactive event controls is changed to a second spatial relationship.

14 Claims, 5 Drawing Sheets

(51) Int. Cl.
*H04N 21/431* (2011.01)
*H04N 21/4722* (2011.01)
*H04N 21/472* (2011.01)
*H04N 21/2665* (2011.01)
*H04N 21/4725* (2011.01)
*A63F 13/25* (2014.01)
*A63F 13/27* (2014.01)
*A63F 13/69* (2014.01)
*A63F 13/85* (2014.01)
*A63F 13/49* (2014.01)

(52) U.S. Cl.
CPC .............. *A63F 13/85* (2014.09); *A63F 13/86* (2014.09); *H04N 21/2665* (2013.01); *H04N 21/4314* (2013.01); *H04N 21/472* (2013.01); *H04N 21/4722* (2013.01); *H04N 21/4725* (2013.01); *A63F 13/49* (2014.09); *A63F 2300/8082* (2013.01)

(56) References Cited

U.S. PATENT DOCUMENTS

| | | | |
|---|---|---|---|
| 8,112,711 B2 | 2/2012 | Ackley | |
| 2002/0119823 A1 | 8/2002 | Beuscher | |
| 2008/0229352 A1 | 9/2008 | Pino et al. | |
| 2011/0122063 A1* | 5/2011 | Perlman | A63F 13/335 345/161 |
| 2013/0162680 A1* | 6/2013 | Perry | G06T 11/00 345/634 |
| 2013/0268837 A1 | 10/2013 | Braithwaite et al. | |
| 2014/0006129 A1* | 1/2014 | Heath | G06Q 30/0222 705/14.23 |
| 2016/0066053 A1 | 3/2016 | Bielman et al. | |
| 2016/0110903 A1* | 4/2016 | Perrin | H04L 67/38 345/634 |
| 2017/0006322 A1* | 1/2017 | Dury | H04N 21/254 |
| 2017/0034237 A1* | 2/2017 | Silver | H04L 65/604 |
| 2017/0354883 A1* | 12/2017 | Benedetto | A63F 13/533 |
| 2019/0075339 A1* | 3/2019 | Smith | H04N 21/25883 |

OTHER PUBLICATIONS

"Interactive 2 Protocol Specification", Retrieved From: <<https://dev.mixer.com/reference/interactive/protocol/protocol.pdf>>, Retrieved on: Nov. 24, 2017, pp. 1-49.

"Interactive Reference Documentation", Retrieved From: <<https://dev.mixer.com/reference/interactive/index.html>>, Retrieved on: Nov. 24, 2017, 21 Pages.

"Mixer—Interactive Livestreaming", Retrieved From: <<https://mixer.com/?sandbox=xdks.1>>, Retrieved on: Nov. 24, 2017, 1 Page.

"Performance—interactive-cpp", Retrieved From: <<https://github.com/mixer/interactive-cpp/wiki/Performance>>, Retrieved on: Nov. 24, 2017, 2 Pages.

"Performance—interactive-unity-plugin", Retrieved From: <<https://github.com/mixer/interactive-unity-plugin/wiki/Performance>>, Retrieved on: Nov. 24, 2017, 2 Pages.

"Engage, Monetize, and Analyze", Retrieved From: <<http://info.maestra.io/product>>, Retrieved on: Nov. 22, 2017, 10 Pages.

Saito, Cheri, "Introducing Extensions: the next evolution in live streaming", Retrieved From: <<https://blog.twitch.tv/introducing-extensions-the-next-evolution-in-live-streaming-20969f4c2754>>, Aug. 31, 2017, 4 Pages.

"Maestro Tutorial: Broadcasting", Retrieved From: <<https://youtu.be/Epr-36R2hYU?t=203>>, Oct. 6, 2015, 3 Pages.

* cited by examiner

300

302 RECEIVE A VIDEO STREAM DEPICTING AN INTERACTIVE EVENT

304 RECEIVE DATA REPRESENTING ONE OR MORE INTERACTIVE EVENT CONTROLS MANIPULABLE BY A VIEWER OF THE INTERACTIVE EVENT TO PROVIDE INPUT TO THE INTERACTIVE EVENT

306 DISPLAY THE VIDEO STREAM AND THE ONE OR MORE INTERACTIVE EVENT CONTROLS AS COMPONENTS OF A USER INTERFACE WITH A FIRST SPATIAL RELATIONSHIP

308 BASED ON DETECTING A CHANGE IN STATE OF THE INTERACTIVE EVENT, CHANGE THE FIRST SPATIAL RELATIONSHIP TO A SECOND SPATIAL RELATIONSHIP

FIG. 3

INTERACTIVE EVENT BROADCASTING

CROSS REFERENCE TO RELATED APPLICATIONS

This application claims priority to U.S. Provisional Patent Application Ser. No. 62/571,692, filed Oct. 12, 2017, the entirety of which is hereby incorporated herein by reference for all purposes.

BACKGROUND

Via the Internet, various interactive events, including events taking place in real or virtual environments, may be broadcast to interested viewers around the world. In some cases, viewers may be provided with one or more interactive event controls that enable the viewers to interact with the interactive event itself. As an example, an interactive event control may allow a viewer to provide a bonus to one or more players or teams participating in a video game or e-sports competition.

BRIEF DESCRIPTION OF THE DRAWINGS

FIG. 3 illustrates an example method for interactive event broadcasting.

DETAILED DESCRIPTION

Figure 1:
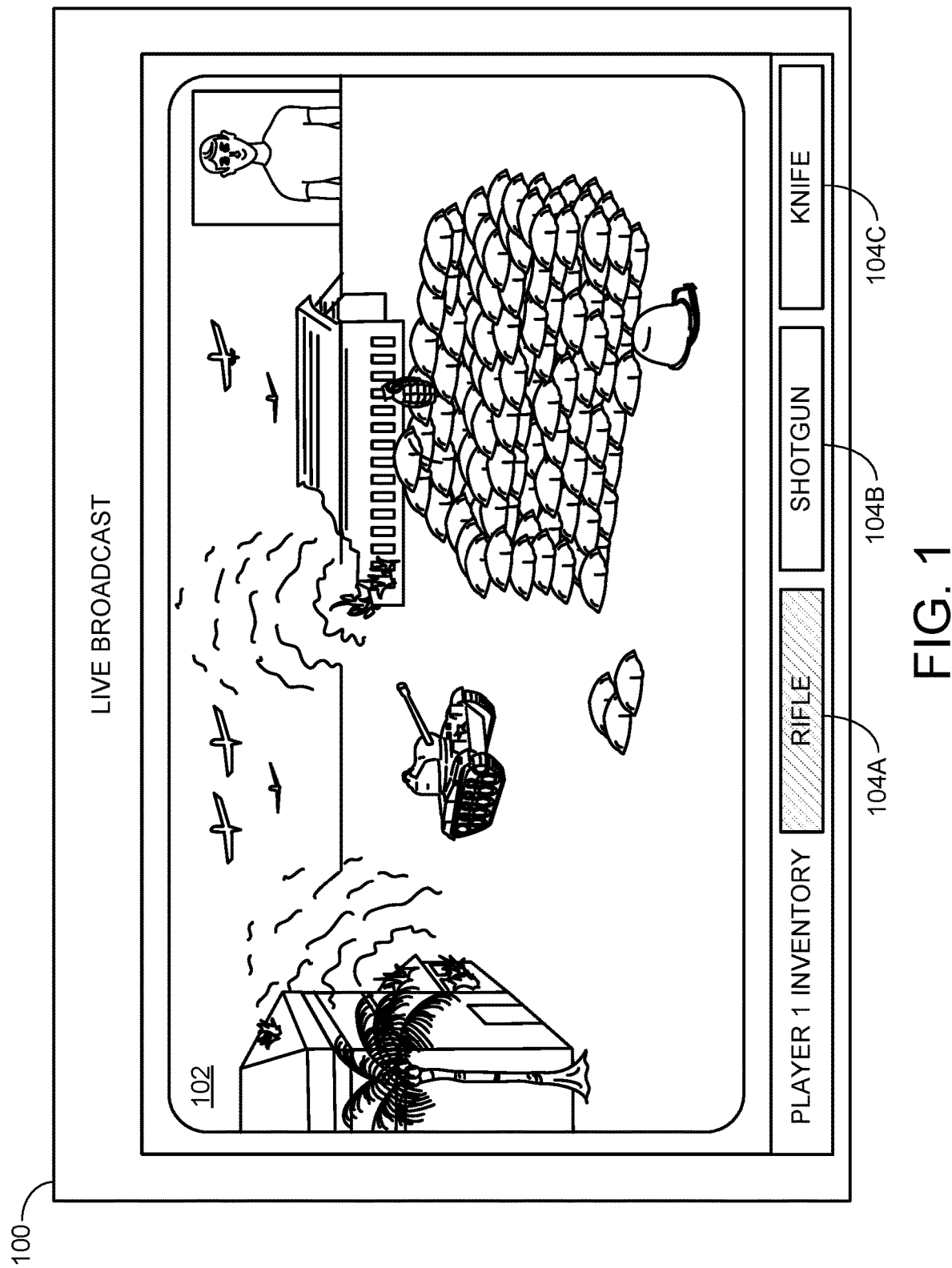
FIG. 1 depicts an example user interface (UI) including a broadcast of an interactive event.

In some cases, audiovisual content from an interactive event may be broadcast to viewers over a network. For example, an individual playing a video game may broadcast their active gameplay over the Internet for viewing by interested viewers around the world. Similarly, multiple players may interact or compete in a shared virtual space, and audiovisual content from the shared virtual space may be broadcast over the Internet. In a different scenario, the interactive event may take place in the real world (e.g., a real-world sporting competition), and audiovisual content of the interactive event (e.g., captured by a camera) may be broadcast.

With specific regard to video games, viewers of a gameplay broadcasts often have some ability to interact with the individual(s) playing the video game (i.e., the "broadcaster" or "player"), for example by providing text questions or comments in a chat interface. Additionally, or alternatively, the viewers may be have some ability to interact with the interactive event itself. For example, a user interface (UI) may include one or more interactive event controls that can be manipulated by the viewer to provide inputs to and/or affect the state of the interactive event. Such controls may, for example, allow the viewer to provide a specific player with a bonus, alter the player's inventory, vote for which team of players should receive a powerup, etc. In the case of an interactive event that takes place in the real world, interactive event controls may allow viewers to, for example, alter lighting conditions of a stadium, vote for or suggest specific plays or strategies, and/or provide other input.

Interactive event controls may be implemented in various ways. In a typical example, a viewer may view a user interface provided by a web browser or dedicated viewing client, the user interface including a video stream of the interactive event as well as one or more user-interactable elements. Examples of such user-interactable elements can include links to other event broadcasts, settings menus, chat interfaces, the interactive event controls discussed above, etc. A user interface including these elements may be arranged in any suitable way, meaning the video broadcast, chat interface, interactive event controls, etc., can have any suitable size and position relative to each other and to the user interface.

Generally, the displayed user interface will be arranged to optimize the available space, meaning the UI components are sized and positioned such that they are each appropriately visible and accessible to the viewer. However, in some cases the optimal UI arrangement can change as an interactive event unfolds. Because typical user interfaces are locked into relatively static configurations, changing conditions in the interactive event may cause the user interface to gradually or abruptly become less useable, for instance as interactive event controls are forced to adopt inefficient shapes or pack extra content into small windows.

Accordingly, the present disclosure contemplates techniques for broadcasting interactive events to allow a spatial relationship between components of a user interface to change as the interactive event unfolds. Specifically, upon receiving a video stream depicting an interactive event and data representing one or more interactive event controls, a viewer device may display a user interface including the video stream and the interactive event controls to a viewer. Components of this user interface may be presented with a first spatial relationship, meaning each component has a particular size and position within the user interface. However, based on one or more changes in a current state of the interactive event, this spatial relationship may be changed. Interface components (e.g., the video stream and/or interactive event controls) can be added, removed, made bigger/smaller, repositioned, stacked, cascaded, etc. This provides for a better user experience for viewers of the interactive event, allowing them to continue to view and interact with the interactive event in a manner that is efficient and intuitive, regardless of changing conditions within the interactive event.

The present disclosure primarily focuses on interactive events that are unfolding live. Thus, the interactive event controls discussed herein typically allow viewers to provide live input to the live interactive event, for instance by altering the execution of a software application. However, it will be understood that the interactive event broadcasting techniques described herein may also be applied to interactive events that are not viewed live. In such cases, interactive event controls provided with a video stream may be useable to review supplemental data or statistics associated with the interactive event, rather than provide live input. As used herein, "interactive event" will refer to both live and non-live interactive events, and "interactive event control" will refer to any suitable viewer-interactable interface element that allows a viewer to provide live input to the interactive event, and/or access supplementary data associated with the interactive event.

FIG. 1 depicts an example user interface 100 including a live video stream 102 of an interactive event. User interface 100 may be rendered and/or displayed by any suitable computing system. For example, user interface 100 may be rendered by a personal smartphone, wearable device, tablet, laptop, desktop, server, augmented/virtual reality device, media center, etc. In some examples, user interface 100 may be rendered and/or displayed by computing system 500 described below with respect to FIG. 5.

In FIG. 1, the interactive event is a multiplayer video game. Thus, video stream 102 includes active gameplay of the video game. However, in other examples, video of other interactive events may be broadcast. As used herein, "interactive event" refers to any event taking place in either a real or virtual space that remote viewers can interact with. For example, as in FIG. 1, "interactive event" can refer to the execution of video game software by one or more computing devices, causing the rendering of audiovisual content. By interacting with interactive event controls in a user interface, viewers may affect the interactive event by, for example, altering one or more properties or variables of the video game software, thereby affecting how the video game software is executed. In a different example, "interactive event" could refer to a sporting event taking place in the real world. Viewer interaction with the interactive event controls could, for example, suggest plays or strategies to a particular player or team, alter lighting conditions in the stadium, etc. It will be understood that the interface arrangement techniques described herein can be used regardless of the specific nature of the interactive event that is broadcast.

Further, it will be understood that an interactive event may have any suitable number of players or participants. For example, an interactive event could refer to a single individual playing a video game, or thousands of people all interacting in an online virtual space, a group of players competing in a real-world stadium, etc.

Also shown in FIG. 1 are several interactive event controls 104. In this example, the interactive event controls allow viewers of the interactive event to manage the inventory of a player-character participating in the interactive virtual event. Specifically, selection of interactive event control 104A may cause the video game software providing the interactive virtual event to automatically change the player-character's equipped item to a "rifle." Similarly, selection of interactive event controls 104B or 104C may change the player-character's equipped item to a "shotgun" or "knife," respectively. Because the interactive event is a video game, controls 104 may be described in this example as "interactive game controls."

In other examples, viewer selection of one of the interactive event controls 104A may not immediately change the player-character's equipped item. Rather, selection of one of the interactive event controls 104 may amount to a suggestion to the player of an item that the viewer believes their player-character should equip. In a different example, selection of one of the interactive event controls 104 may constitute a vote for the item that the viewer believes the player-character should equip. Upon a particular item receiving a majority of the votes cast by viewers, it may be automatically equipped. Alternatively, the item with the most votes may be automatically equipped once an in-game condition or threshold is met (e.g., the start of a new match), or the player may simply be provided a notification indicating which item a majority of viewers voted for. It will be understood that interactive event controls, such as those shown in FIG. 1, may function in any suitable way.

The user interface shown in FIG. 1, including the video stream of the interactive event as well as the interactive event controls, are presented as non-limiting examples. In other examples, a user interface may include more/fewer/different components and interactable elements, having any suitable size and position. Similarly, interactive event controls may be manipulated/interacted with in any suitable way, and can be used to provide any suitable input to an interactive event and/or participant in the interactive event.

Figure 2:
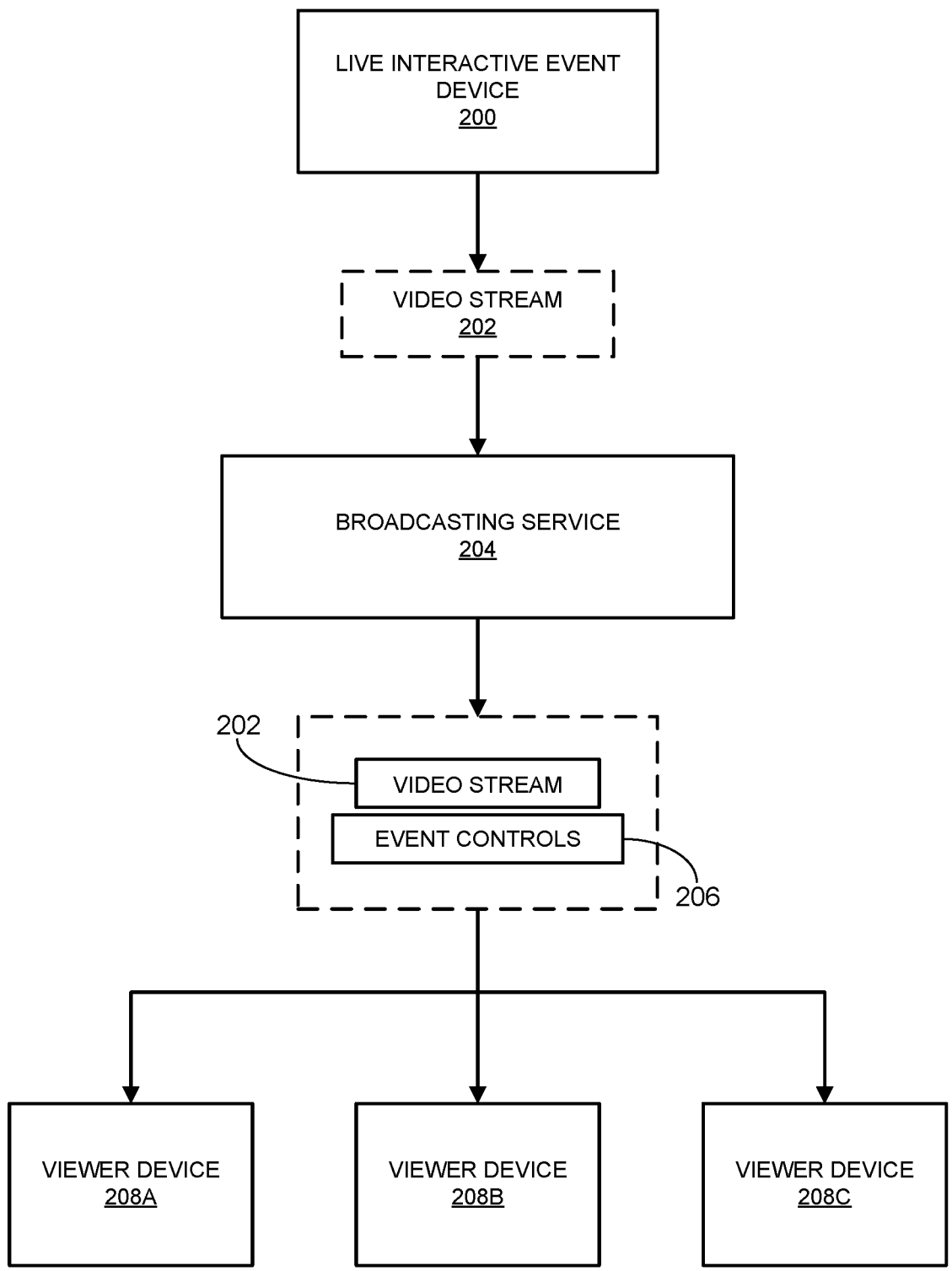
FIG. 2 schematically shows an example environment that facilitates broadcasting of interactive events.

FIG. 2 schematically depicts an example network infrastructure that may be used to facilitate streaming of interactive events as described herein. Specifically, FIG. 2 shows an interactive event device 200, which may be any suitable computing device associated with the interactive event. For example, when the interactive event is a video game, then device 200 may be a personal computer or video game console that is executing video game software and rendering resulting audiovisual content. In a different example, the interactive event device may be a server computer associated with an online gaming service that is executing video game software and thereby providing a virtual video game environment in which one or more players are interacting or competing. The interactive event device may take on other suitable forms depending on the nature of the interactive event itself. In general, the interactive event device will be any suitable computing device that is capable of providing a live video stream of an interactive event and receiving input provided by one or more viewers via interactive event controls. For example, the interactive event device may be implemented as computing system 500 described below with respect to FIG. 5.

Also shown in FIG. 2 is a video stream 202 of the interactive event. The video stream may be encoded and transmitted in any suitable way, for example using any suitable compression protocol, codec, etc. In some examples and depending on the nature of the interactive event, the video stream may comprise raw output of a video game application or other suitable software, which may be processed/modified/rendered by the broadcasting service and/or a different suitable device. In other words, the interactive event device may transmit a data stream representing the interactive event that includes or is useable to produce the video stream. In the example of a video game, the interactive event device may transmit all or part of the live executing game code, which may in some cases be rendered by the broadcasting service to produce the video stream. In other examples, the video stream may comprise a representation or copy (recorded via screen capture or similar technologies) of the visual content displayed to a participant in the interactive event. The video stream may additionally or alternatively include footage of real-world places or objects. For example, the video stream may include recording of real-world events, a live stream of a player's/broadcaster's face, etc.

The video stream 202 is received by a broadcasting service 204. Generally, the broadcasting service will be any service, process, application, etc., configured to take a video stream of an interactive event and make it available to interested viewers over the Internet, or other suitable network. The broadcasting service may be provided by a $3^{rd}$ party (e.g., a website or application developer), maintained by a developer or organizer of the interactive event, maintained by a player/broadcaster participating in the interactive event, and/or another suitable party. In some cases, the broadcasting service may be provided by software running on the same device(s) providing and/or recording the interactive event. The broadcasting service can be implemented on any suitable computing devices, such as computing system 500 described below with respect to FIG. 5.

In some examples, the broadcast service may be configured to augment or supplement the video stream with one or more of the interactive event controls discussed above. In general, augmentation of the broadcast with the interactive event controls could be performed by any of the interactive event device, broadcasting service, and individual viewer devices, and all of these arrangements are within the scope of this disclosure. However, in practice, it will often be beneficial for the broadcasting service to manage the interactive event controls. This can prevent viewers of the broadcast from having to install event-specific software on their devices, and it allows the interactive event device to be agnostic to the specific broadcasting service used (i.e., it allows the interactive event device to support multiple broadcasting services independently, even those that do not support interactive event controls).

The interactive event controls may be represented on the broadcasting service in any suitable way. In some examples, the appearance and functionality of the interactive event controls may be represented as computer data using a suitable programming, scripting, or design language/protocol. For example, the interactive event controls may be built/specified using any or all of the Hypertext Markup Language (HTTP), Cascading Style Sheets (CSS), JavaScript Object Notation (JSON), etc. The interactive event controls may be provided to the broadcasting service by any suitable party, for instance by a developer (e.g., of a video game application), an organizer of an interactive event, etc. The interactive event controls may be sent to the broadcasting service at any suitable time, for instance when a video game is released or an interactive event is scheduled/begins. Alternatively, when the interactive event is provided by a software application (e.g., a video game), the interactive event controls may be developed in tandem with the software application, for instance on a developer computing device or on a platform provided by the broadcasting service.

In FIG. 2, the video stream 202 is transmitted by the broadcasting service along with interactive event controls 206. As discussed above, an interactive event control allows a viewer of the interactive event to affect or interact with the interactive event in some way, and/or access supplemental data associated with the interactive event. Accordingly, the broadcasting service may be configured to receive, from one or more viewer devices, an indication that a viewer has manipulated an interactive event control. Based on the nature of this manipulation, the broadcasting service may provide an input to the interactive event device, which may then affect or influence the interactive event itself.

The video stream and interactive event controls may be transmitted by the broadcasting service in any suitable way. In some cases, the video stream and event controls may be sent as separate data streams and combined into a single user interface by the viewer devices. In such cases, one or both of the video stream and the interactive event controls may include or be sent alongside formatting data specifying the size and placement of the video stream and event controls within the user interface. In other cases, the video stream and interactive event controls may be rendered together as a user interface by the broadcasting service, and therefore transmitted to the viewer devices together as a single data stream. The size and placement of user interface elements may in some cases be specified by the developer/organizer of the interactive event and/or the player/broadcaster who initiated the interactive event broadcast.

In FIG. 2, the video stream 202 and interactive event controls 206 are received by viewer devices 208A-208C. It will be understood that a "viewer device" as described herein may take any suitable form. For example, a viewer device may be a smartphone, wearable device, tablet, laptop, desktop, augmented/virtual reality device, media center, etc. In some cases, a viewer device may be implemented as computing system 500 described below with respect to FIG. 5.

Upon receiving the video stream and interactive event controls from the broadcasting service, a viewer device may then display the video stream and event controls as components of a user interface. As discussed above, FIG. 1 shows an example user interface 100 including a video stream of an interactive event as well as multiple interactive event controls. Upon a viewer interacting with one of the event controls, data representing the interaction may be transmitted by the viewer device to the broadcasting service, and provided as an input to the interactive event device.

As discussed above, in some cases, changing conditions in an interactive event may make it desirable to change a current layout of a displayed user interface. Using the example of FIG. 1, three items from the player's inventory are represented as interactive event controls below the video stream. However, there is not room in user interface 100 to represent more than three items, which may be problematic should the player acquire a new item, or should the viewer want to view more of the player's inventory at once.

Accordingly, FIG. 3 illustrates an example method 300 for interactive event broadcasting. It will be understood that method 300 may be implemented on any or all of the computing devices described above, including the interactive event device, a device associated with the broadcasting service, a viewer device, etc. In some cases, method 300 may be implemented on computing system 500 described below with respect to FIG. 5.

At 302, method 300 includes receiving a video stream depicting an interactive event. As discussed above, the video stream and interactive event may both take any suitable forms. In some cases, the interactive event may include active gameplay of a video game, and take place in a video game environment. In other cases, the interactive event may be a real-world event, and take place in a real-world environment.

At 304, method 300 includes receiving data representing one or more interactive event controls, the interactive event controls being manipulable by a viewer of the interactive event to provide input to the interactive event. For example, when the interactive event is a video game, an interactive event control may be useable by a viewer to provide a bonus to a player-character of the video game. Similarly, an interactive event control may be useable by the viewer to manage an inventory of a player-character of the video game, vote for one or more players or teams, review statistics, browse an environment map, suggest specific strategies or plays, etc. As discussed above, interactive event controls need not be useable to directly influence a live-occurring interactive event, and in some cases may simply allow the viewer to access supplemental data relating to the interactive event (e.g., gameplay statistics, related matches or events, replays, environmental data).

At 306, method 300 includes displaying the video stream depicting the interactive event and the one or more interactive event controls as components of a user interface, the video stream and the one or more interactive event controls having a first spatial relationship. For example, as discussed above, FIG. 1 depicts an example user interface 100 including a video stream 102 and several interactive event controls 104. As shown in FIG. 1, the video stream and interactive event controls have a first spatial relationship, in that the interactive event controls are arrayed horizontally below the video stream. However, it will be understood that the user interface may take any suitable from, and the various components of the user interface may have any suitable spatial relationship.

Returning briefly to FIG. 3, at 308, method 300 includes, based on detecting a change in state of the interactive event, changing the first spatial relationship between the video stream depicting the interactive event and the one or more interactive event controls to a second spatial relationship. For example, reusing the example of user interface 100, more inventory items could be exposed to the viewer if the live video stream was shrunk vertically to make room for a second row of interactive event controls. Alternatively, the video stream could be shrunk horizontally, and the interactive event controls placed in a vertically-aligned list, thereby allowing more inventory items to be reviewed at once.

This change may be initiated by any of the interactive event device, broadcasting service, and viewer device. In a typical example, the change will be initiated by the broadcasting service which, upon detecting a change in a current state of the interactive event, may transmit new formatting data to the viewer device, thereby causing the arrangement of the user interface presented by the viewer device to change.

This is illustrated in FIG. 4, which again shows user interface 100. However, in FIG. 4, the horizontal dimensions of the video stream have been reduced, thereby making room for the interactive event controls to be placed in a vertical list to the side of the video stream. With this arrangement, the viewer still has an adequate view of the video stream, and can now see additional interactive event controls corresponding to additional inventory items (i.e., interactive event controls 104D-104F).

Figure 4:
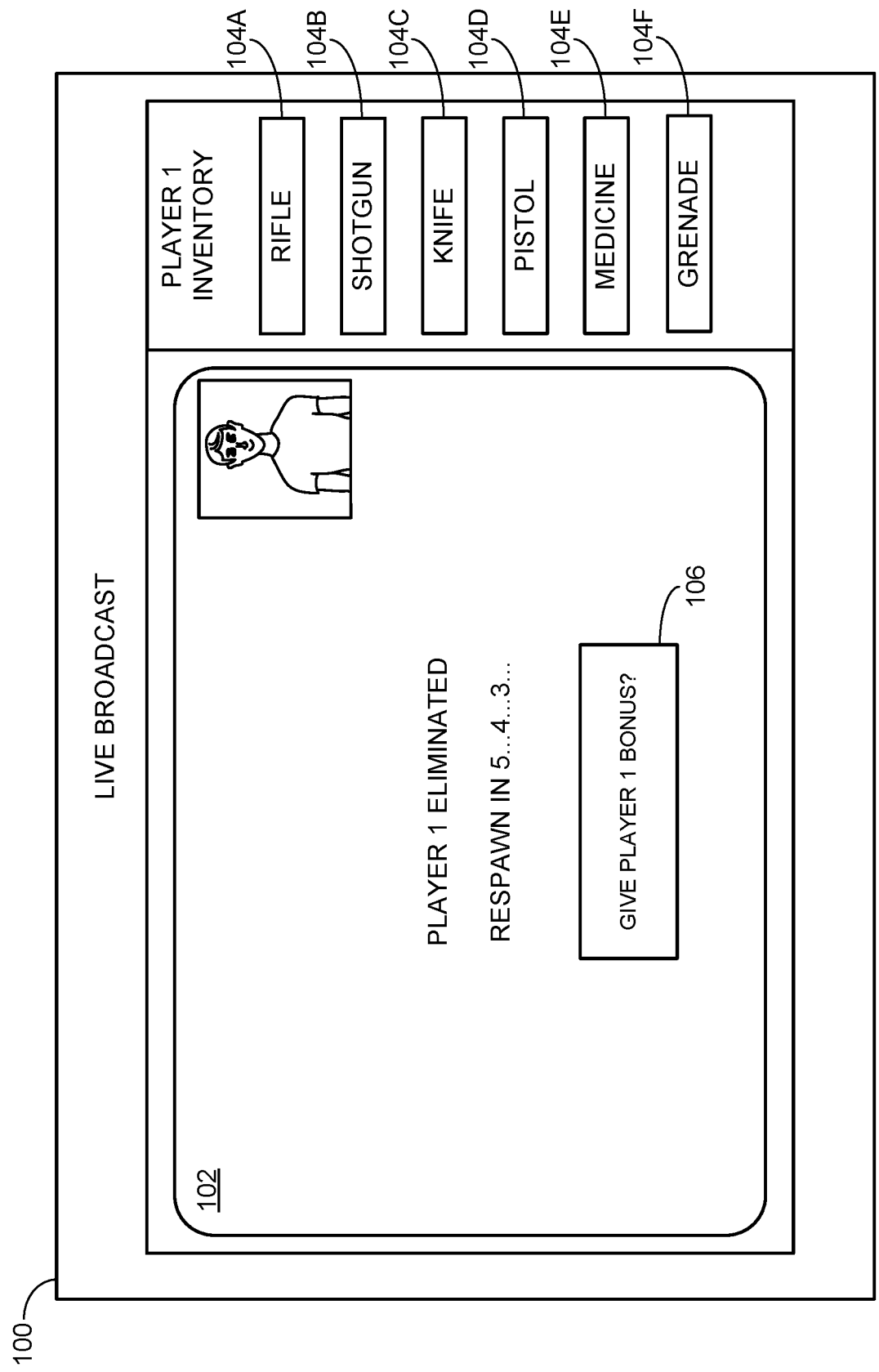
FIG. 4 depicts the example UI of FIG. 1 in which a spatial relationship between a video stream and interactive event controls has changed.

A change in layout of a user interface may be prompted by any number of changes to the state of an interactive event. For instance, a user interface layout may be automatically changed when a player-character of a video game acquires a new item, a viewer interacts with the "inventory" controls pane, the player requests help selecting a new item, a current match ends, the video game enters a pause or loading state, the player-character is killed or eliminated, the player-character enters a new area of the video game environment, etc. In the example of FIG. 4, the change in state has occurred because the player-character was eliminated, and is in the process of respawning. During this period, viewers of the broadcast may interact with interactive event controls 104 and/or newly-added control 106 to, for example, change the player-character's inventory, or provide the player-character with a bonus.

Furthermore, the spatial relationship between components of a user interface may be changed in a variety of ways. For example, changing the first spatial relationship to the second spatial relationship can include changing a current size of one or both of the video stream and the one or more interactive event controls. In the example of FIG. 4, the current size of the video stream has been reduced (along a horizontal axis), while the size of the interactive event controls has been increased (to take up more total screen space).

Similarly, changing the first spatial relationship of user interface components to the second spatial relationship can include changing a current position of one or both of the video stream and the one or more interactive event controls. This is also shown in FIG. 4, as the position of interactive event controls 104 has changed—i.e., by moving from below the video stream to a position on the right of the video stream. As will be discussed in more detail below, in some cases, changing the position of an interactive event control can include overlaying at least a portion of an interactive event control on the video stream.

In some examples, changing the first spatial relationship to the second spatial relationship can include one or both of adding additional interactive event controls, or removing previously-displayed interactive event controls. To use the example of FIG. 4, interactive event controls 104D-104F have been added, along with interactive event control 106. Notably, interactive event control 106 is overlaid on video stream 102. In this example, the player-character is currently respawning, and video stream 102 is largely devoid of content. Thus, interactive event control 106 may be overlaid on the video stream without occluding interesting audiovisual content. In other examples, interactive event controls may be overlaid on the video stream in response to other gameplay events or suitable circumstances.

It will be understood that the specific interactive event controls and user interface layouts shown in FIGS. 1 and 4 are presented as examples and are not limiting. In general, either or both of the size and position of the video stream and interactive event controls can be dynamically changed at any time, and in any way. In other words, both the video stream and interactive event controls can be moved to any suitable location within the user interface, adjusted to have any suitable size, and added/removed in response to any suitable state change of the interactive event.

Furthermore, suddenly or abruptly changing the layout of a user interface can be jarring and disconcerting to a viewer. Accordingly, in some cases, the transition from one interface layout to another may be animated. For example, upon movement of the event controls, rather than immediately moving from one place to another, the event controls may slowly glide across the interface in a manner that is visually pleasing to the user. Similar visual effects can be used for moving the video stream, and/or resizing of one or both of the video stream and event controls. It will be understood that layout transitions may be animated in any suitable way, and accompanied by any suitable visual and/or audible effects.

It will be understood that the techniques described herein may be implemented in any suitable way, and using any suitable computer programming language. However, provided below is one example implementation that allows the layout of a user interface to be dynamically changed during an interactive event, using the TypeScript programming language. Specifically, the below code defines how interactive event controls may be sized and positioned by developers. For example, using the following code, the developer may specify a given control's X and Y positions relative to a user interface (e.g., in pixels); the control's height and width; the control's aspect ratio; the appearance and function of the interactive event control (e.g., a "button" or a "joystick"); the position of the video stream within the user interface (e.g., when the interactive event control is on-screen, or otherwise active); the duration of any movements of the interactive event control within the user interface; the placement of the interactive event control within a grid layout, etc.

```
/**
 * Dimensions exist on every Interactive control and
 define its display.
```

```
        */
export interface IDimensions {
        /**
         * x position, in pixels
         */
        x: number;
        /**
         * y position, in pixels
         */
        y: number;
        /**
         * control width, in pixels
         */
        width: number;
        /**
         * control height, in pixels
         */
        height: number;
}
/**
 * IControlOptions are passed to the @Control decorator to describe how
 * the control is rendered.
 */
export interface IControlOptions {
        /**
         * The kind of the control that this class should render. The default
         * kinds are "button" and "joystick".
         */
        kind: string;
        /**
         * 'dimensions' can be passed into inputs for the control dimensions
         * (IDimensions) to define bounds for how it can be manipulated in the
         * Interactive editor.
         * - 'aspectRatio' locks a control's aspect ratio (width / height)
         * - 'width' locks with width percentage
         * - 'height' locks the height percentage
         */
        dimensions?: (
                | { property: 'aspectRatio'; minimum: number; maximum: number }
                | { property: 'width'; minimum?: number; maximum?: number }
                | { property: 'height'; minimum?: number; maximum?: number })[ ];
        /**
         * Control inputs. Note: this will be filled in automatically for you
         * if you use the @Input decorator, but this may come in handy if you
         * don't want to or can't use them in your environment.
         */
        inputs?: { [property: string]: IInputOptions };
}
/**
 * IVideoPositionOptions are passed into display.moveVideo( ) to change
 * where the video is shown on the screen.
 */
export interface IVideoPositionOptions {
        /**
         * Position of the video on screen from the left-hand
         * edge of the container.
         * If omitted, it's not modified. If -1, any previous
         * setting is cleared.
         */
        left?: number;
        /**
         * Position of the video on screen from the top edge of
         * the container.
         * If omitted, it's not modified. If -1, any previous
         * setting is cleared.
         */
        top?: number;
        /**
         * Position of the video on screen from the right-hand
         * edge of the container.
         * If omitted, it's not modified. If -1, any previous
         * setting is cleared.
         */
        right?: number;
        /**
         * Position of the video on screen from the bottom edge
         * of the container.
         * If omitted, it's not modified. If -1, any previous
         * setting is cleared.
         */
        bottom?: number;
        /**
         * Width of the video on screen as in pixels.
         * If omitted, it's not modified. If -1, any previous
         * setting is cleared.
         */
        width?: number;
        /**
         * Height of the video on screen as in pixels
         * If omitted, it's not modified. If -1, any previous
         * setting is cleared.
         */
        height?: number;
        /**
         * Duration of the movement easing in milliseconds. Defaults to 0.
         */
        duration?: number;
        /**
         * CSS easing function. Defaults to 'linear'.
         * @see https://developer.mozilla.org/en-US/docs/Web/CSS/transition-timing-function
         */
        easing?: string;
}
/**
 * Layout contains type definitions for various layout primitives.
 */
export namespace Layout {
        /**
         * A grid placement represents a placement of a control within a scene using
         * the fixed-grid display mode.
         *
         * A control can have many grid placements where each placement is used
         * within a different interactive grid.
         */
        export interface IGridPlacement {
                /**
                 * The Size of the grid this placement is for.
                 */
                size: 'large' | 'medium' | 'small';
                /**
                 * The width of this control within the grid.
                 */
                width: number;
                /**
                 * The height of this control within the grid.
                 */
                height: number;
                /**
                 * The X position of this control within the grid.
                 */
                x: number;
                /**
                 * The Y position of this control within the grid.
                 */
                y: number;
        }
        /**
         * IGridDefinition defines the grid's physical screen
         * size. This is used
         * internally in the fixed-grid display mode. This is
         * not configurable.
         */
```

```
        export interface IGridDefinition {
                size: 'large' | 'medium' | 'small';
                width: number;
                height: number;
                minWidth: number;
        }
        /**
                * Offers constant information values to use in an
application.
                */
        export const gridLayouts:
ReadonlyArray<Readonly<IGridDefinition>> = [
                {
                                size: 'large',
                                minWidth: 900,
                                width: 80,
                                height: 20,
                },
                {
                                size: 'medium',
                                minWidth: 540,
                                width: 45,
                                height: 25,
                },
                {
                                size: 'small',
                                minWidth: 0,
                                width: 30,
                                height: 40,
                }, ];
```

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
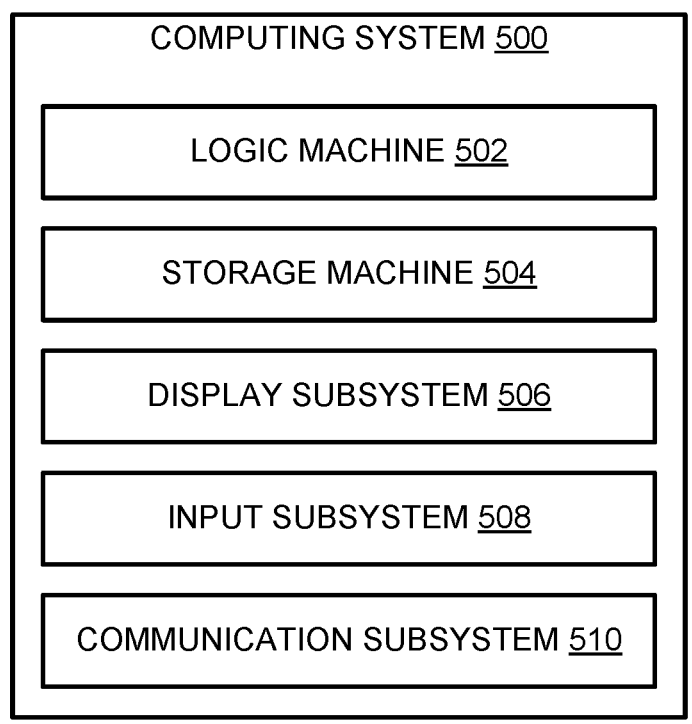
FIG. 5 schematically shows an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 502 and a storage machine 504. Computing system 500 may optionally include a display subsystem 506, input subsystem 508, communication subsystem 510, and/or other components not shown in FIG. 5.

Logic machine 502 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 504 includes one or more physical devices configured to hold instructions executable by the logic machine to implement the methods and processes described herein. When such methods and processes are implemented, the state of storage machine 504 may be transformed—e.g., to hold different data.

Storage machine 504 may include removable and/or built-in devices. Storage machine 504 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 504 may include volatile, nonvolatile, dynamic, static, read/write, read-only, random-access, sequential-access, location-addressable, file-addressable, and/or content-addressable devices.

It will be appreciated that storage machine 504 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 502 and storage machine 504 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 502 executing instructions held by storage machine 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 506 may be used to present a visual representation of data held by storage machine 504. This visual representation may take the form of a graphical user interface (GUI). As the herein described methods and processes change the data held by the storage machine, and thus transform the state of the storage machine, the state of display subsystem 506 may likewise be transformed to visually represent changes in the underlying data. Display subsystem 506 may include one or more display devices utilizing virtually any type of technology. Such display devices may be combined with logic machine 502 and/or storage machine 504 in a shared enclosure, or such display devices may be peripheral display devices.

When included, input subsystem 508 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 510 may be configured to communicatively couple computing system 500 with one or more other computing devices. Communication subsystem 510 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

In an example, a method for interactive event broadcasting comprises: receiving a video stream depicting an interactive event; receiving data representing one or more interactive event controls, the interactive event controls being manipulable by a viewer of the interactive event to provide input to the interactive event; displaying the video stream depicting the interactive event and the one or more interactive event controls as components of a user interface, the video stream and the one or more interactive event controls having a first spatial relationship; and based on detecting a change in state of the interactive event, changing the first spatial relationship between the video stream depicting the interactive event and the one or more interactive event controls to a second spatial relationship. In this example or any other example, changing the first spatial relationship to the second spatial relationship includes changing a current size of one or both of the video stream and the one or more interactive event controls. In this example or any other example, changing the current size includes reducing a current size of the video stream and increasing a current size of the one or more interactive event controls. In this example or any other example, changing the first spatial relationship to the second spatial relationship includes changing a current position of one or both of the video stream and the one or more interactive event controls. In this example or any other example, changing the current position includes overlaying at least a portion of an interactive event control on the video stream. In this example or any other example, changing the first spatial relationship to the second spatial relationship includes one or both of adding additional interactive event controls or removing previously-displayed interactive event controls. In this example or any other example, the interactive event is active gameplay of a video game, and takes place in a video game environment. In this example or any other example, the change in state of the interactive event occurs when a player-character of the video game acquires a new item. In this example or any other example, the change in state of the interactive even occurs when the video game enters a pause or loading state. In this example or any other example, the change in state of the interactive event occurs when a player-character of the video game is killed or eliminated. In this example or any other example, the change in state of the interactive event occurs when a player-character of the video game enters a new area of the video game environment. In this example or any other example, an interactive event control of the one or more interactive event controls is useable by the viewer to manage an inventory of a player-character of the video game. In this example or any other example, an interactive event control of the one or more interactive event controls is useable by the viewer to provide a bonus to a player-character of the video game. In this example or any other example, the interactive event takes place in a real-world environment.

In an example, an interactive event viewing device comprises: a logic machine; and a storage machine holding instructions executable by the logic machine to: receive a video stream depicting an interactive event; receive data representing one or more interactive event controls, the interactive event controls being manipulable by a viewer of the interactive event to provide input to the interactive event; display the video stream depicting the interactive event and the one or more interactive event controls as components of a user interface, the video stream and the one or more interactive event controls having a first spatial relationship; and based on detecting a change in state of the interactive event, change the first spatial relationship between the video stream depicting the interactive event and the one or more interactive event controls to a second spatial relationship. In this example or any other example, the interactive event is active gameplay of a video game, and takes place in a video game environment. In this example or any other example, changing the first spatial relationship to the second spatial relationship includes changing a current size of one or both of the video stream and the one or more interactive event controls. In this example or any other example, changing the first spatial relationship to the second spatial relationship includes changing a current position of one or both of the video stream and the one or more interactive event controls. In this example or any other example, changing the first spatial relationship to the second spatial relationship includes one or both of adding additional interactive event controls or removing previously-displayed interactive event controls.

In an example, a method for video game broadcasting comprises: receiving a video stream depicting active gameplay of a video game; receiving data representing one or more interactive game controls, the interactive game controls being manipulable by a viewer of the active gameplay to provide input to the video game; displaying the video stream depicting the active gameplay of the video game and the one or more interactive game controls as components of a user interface, the video stream and the one or more interactive game controls having a first spatial relationship; and based on detecting a change in state of the video game, changing the first spatial relationship between the video stream depicting the active gameplay of the video game and the one or more interactive game controls to a second spatial relationship.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for video game broadcasting, comprising:
receiving a data stream from a remote video game device over a network, the data stream useable to render a video stream depicting audiovisual content of a video game;
receiving data representing one or more interactive controls, the interactive controls being manipulable by a viewer of the video stream to provide input to, and influence, the video game;
displaying the video stream depicting the audiovisual content of the video game and the one or more interactive controls as components of a user interface, the video stream and the one or more interactive controls having a first spatial relationship; and
based on detecting a change in the data stream received from the remote video game device over the network corresponding to an in-game event of the video game, automatically changing the first spatial relationship between the video stream and the one or more interactive controls to a second spatial relationship in which a size of the video stream increases or decreases relative to the one or more interactive controls.

2. The method of claim 1, where changing the first spatial relationship to the second spatial relationship includes changing a current position of one or both of the video stream and the one or more interactive controls.

3. The method of claim 2, where changing the current position includes overlaying at least a portion of an interactive control on the video stream.

4. The method of claim 1, where changing the first spatial relationship to the second spatial relationship includes one or both of adding additional interactive controls or removing previously-displayed interactive controls.

5. The method of claim 1, where the in-game event of the video game occurs when a player-character of the video game acquires a new item.

6. The method of claim 1, where the in-game event of the video game occurs when the video game enters a pause or loading state.

7. The method of claim 1, where the in-game event of the video game occurs when a player-character of the video game is killed or eliminated.

8. The method of claim 1, where the in-game event of the video game occurs when a player-character of the video game enters a new area of a video game environment.

9. The method of claim 1, where an interactive control of the one or more interactive controls is useable by the viewer to manage an inventory of a player-character of the video game.

10. The method of claim 1, where an interactive control of the one or more interactive controls is useable by the viewer to provide a bonus to a player-character of the video game.

11. A computing device, comprising:
a logic machine; and
a storage machine holding instructions executable by the logic machine to:
receive a data stream from a remote video game device over a network, the data stream useable to render a video stream depicting audiovisual content of a video game;
receive data representing one or more interactive controls, the interactive controls being manipulable by a viewer of the video stream to provide input to, and influence, the video game;
display the video stream depicting the audiovisual content of the video game and the one or more interactive controls as components of a user interface, the video stream and the one or more interactive controls having a first spatial relationship; and
based on detecting a change in the data stream received from the remote video game device over the network corresponding to an in-game event of the video game, automatically change the first spatial relationship between the video stream and the one or more interactive controls to a second spatial relationship in which a size of the video stream increases or decreases relative to the one or more interactive controls.

12. The computing device of claim 11, where changing the first spatial relationship to the second spatial relationship includes changing a current position of one or both of the video stream and the one or more interactive controls.

13. The computing device of claim 11, where changing the first spatial relationship to the second spatial relationship includes one or both of adding additional interactive controls or removing previously-displayed interactive controls.

14. A method for video game broadcasting, comprising:
receiving a data stream from a remote video game device over a network, the data stream useable to render a video stream depicting audiovisual content of a video game;
receiving data representing one or more interactive controls, the interactive controls being manipulable by a viewer of the video stream to provide input to, and influence, the video game;
displaying the video stream depicting the audiovisual content of the video game and the one or more interactive controls as components of a user interface, the video stream and the one or more interactive controls having a first spatial relationship; and
based on detecting a change in the data stream received from the remote video game device over the network corresponding to an in-game event of the video game, automatically changing the first spatial relationship between the video stream and the one or more interactive controls to a second spatial relationship in which a size of the video stream increases or decreases relative to the one or more interactive controls.

* * * * *